US008793355B2

(12) United States Patent
Moser et al.

(10) Patent No.: US 8,793,355 B2
(45) Date of Patent: *Jul. 29, 2014

(54) TECHNIQUES FOR DIRECTORY DATA RESOLUTION

(75) Inventors: Nathan Moser, Cedar Park, TX (US); Ayman Mobarak, San Francisco, CA (US); Chad Jamart, Clayton, CA (US)

(73) Assignee: Symantec Corporation, Mountain View, CA (US)

( * ) Notice: Subject to any disclaimer, the term of this patent is extended or adjusted under 35 U.S.C. 154(b) by 573 days.

This patent is subject to a terminal disclaimer.

(21) Appl. No.: 12/768,407

(22) Filed: Apr. 27, 2010

(65) Prior Publication Data

US 2011/0264781 A1    Oct. 27, 2011

(51) Int. Cl.
*G06F 15/173* (2006.01)
*H04L 29/12* (2006.01)

(52) U.S. Cl.
CPC ................................. *H04L 61/1523* (2013.01)
USPC ........... 709/223; 709/214; 711/133; 711/134; 711/141

(58) Field of Classification Search
USPC ......... 709/222, 223, 224, 225, 201, 202, 203, 709/214, 215, 216; 711/133, 134, 141
See application file for complete search history.

(56) References Cited

U.S. PATENT DOCUMENTS

| 6,529,953 B1 * | 3/2003 | Van Renesse ................. 709/223 |
| 6,708,170 B1 * | 3/2004 | Byrne et al. .......................... 1/1 |
| 7,302,433 B2 * | 11/2007 | Kalmick et al. .............. 707/694 |
| 8,095,594 B2 * | 1/2012 | Beaven et al. ................. 709/204 |
| 8,161,081 B2 * | 4/2012 | Kaufman et al. ............. 707/802 |
| 2004/0122792 A1 * | 6/2004 | Salazar ............................. 707/1 |
| 2007/0100830 A1 * | 5/2007 | Beedubail et al. ................. 707/9 |
| 2009/0055374 A1 * | 2/2009 | Surazski et al. .................. 707/5 |

FOREIGN PATENT DOCUMENTS

WO    WO-2006/108815    10/2006

OTHER PUBLICATIONS

"Industrial Strength Email Security. For All," IronPort C-Series; IronPort Systems; San Bruno, California; Jan. 2005; 1 page.
"McAfee Email Gateway Total email protection for enterprise environments," Data Sheet; McAfee, Inc.; Santa Clara, California; 2009; 3 pages.
"Barracuda Span & Virus Firewall, Industry leading spam and virus protection," Barracuda Networks, Inc.; Campbell, California; 2010; 2 pages.
International Search report mailed on Aug. 8, 2011 for International Application No. PCT/US2011/033863 filed Apr. 26, 2011 (2 pages).

* cited by examiner

*Primary Examiner* — Dhairya A Patel
(74) *Attorney, Agent, or Firm* — Wilmer Cutler Pickering Hale and Dorr LLP

(57) ABSTRACT

Techniques for directory data resolution are disclosed. In one particular exemplary embodiment, the techniques may be realized as a method for directory data resolution comprising receiving data identifying one or more groups of interest of a directory server, traversing, using a processor, one or more directory entries contained in hierarchical directory data, the traversal starting at a directory entry corresponding to a current group of interest, reading a first directory entry to identify a member contained in the first directory entry, adding, in the event a member is contained in the first directory entry, the current group of interest to a mapping for the member. The method may also include use of caching and recursion.

22 Claims, 9 Drawing Sheets

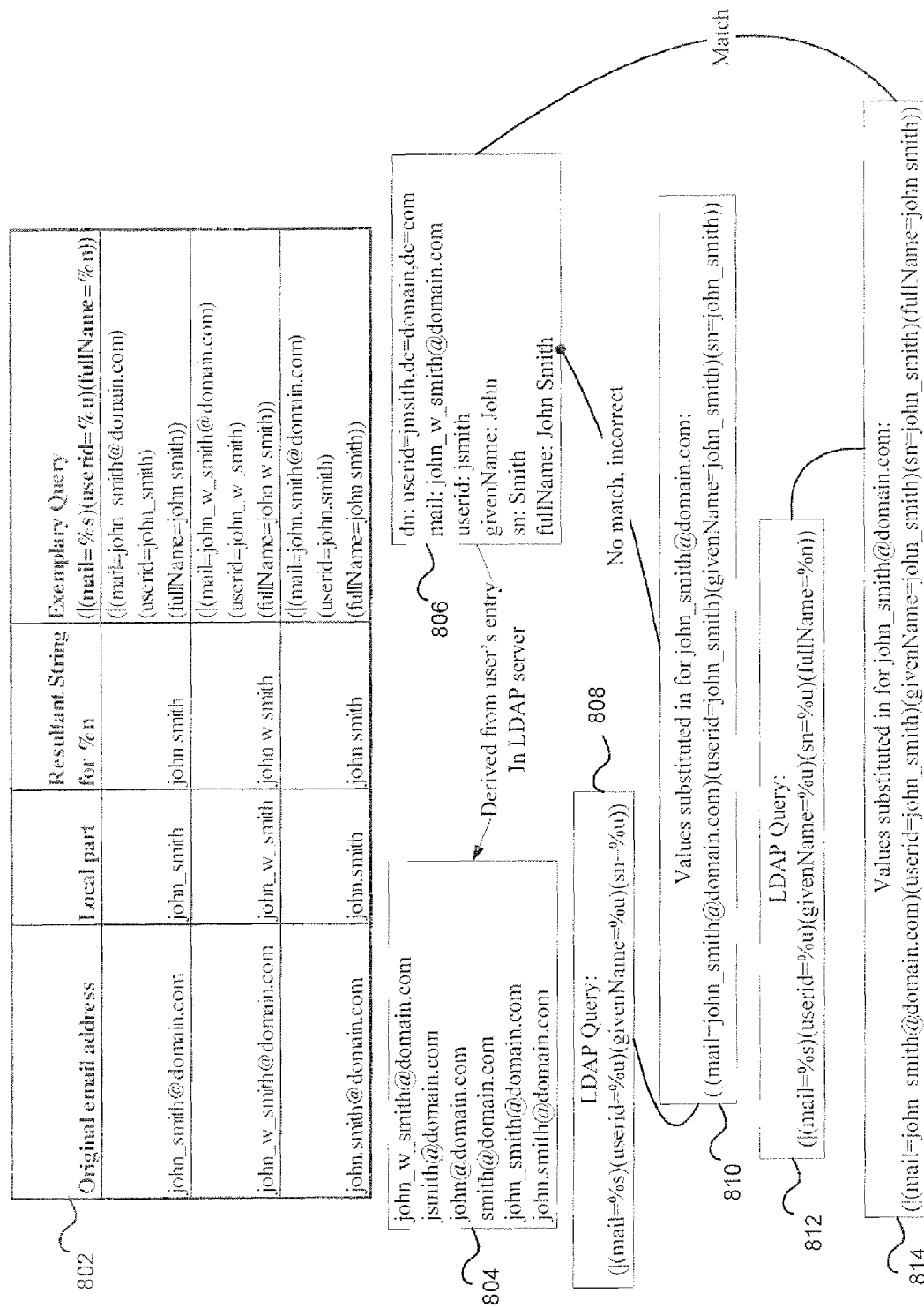

US 8,793,355 B2

TECHNIQUES FOR DIRECTORY DATA RESOLUTION

FIELD OF THE DISCLOSURE

The present disclosure relates generally to directory data services and, more particularly, to techniques for directory data resolution.

BACKGROUND OF THE DISCLOSURE

Directory data services may provide directory data for a variety of clients and applications including user authentication, message delivery, and the application of group policies. Directory data services may serve a plurality of applications in which high throughput is important such as, for example, enterprise class messaging security. Applications and/or directory data services may use cached directory data to improve performance and to reduce a load on a directory server. Directory data may contain groups and distribution lists; for the purposes of this disclosure, a distribution list differs from a group only in that it has at least one email address to which messages can be delivered. A group may have multiple members, each of which could be another group (nested relationship) or 'leaf' entry, such as an entry to represent a user. Groups may be nested many levels deep. Application policies may be set at or bound to one or more groups within the directory server; we term a group bound to an application policy as a 'group of interest'. To determine what policies apply to a user an application may have to traverse multiple levels of groups to identify members. During traversal, groups and users, which are not required to identify members of a group of interest, may be loaded into memory. These extra groups and users may add additional processing time and overhead when attempting to resolve group membership identities for a particular group. Additionally, refreshing group membership and related data structures in cache may add a significant burden to directory servers.

In view of the foregoing, it may be understood that there may be significant problems and shortcomings associated with current directory technologies when used to determine of which groups a user or sub-group is a member.

SUMMARY OF THE DISCLOSURE

Techniques for directory data resolution are disclosed. In one particular exemplary embodiment, the techniques may be realized as a method for directory data resolution comprising receiving data identifying one or more groups of interest of a directory server, traversing, using a processor, one or more directory entries contained in hierarchical directory data, the traversal starting at a directory entry corresponding to a current group of interest, reading a first directory entry to identify a member contained in the first directory entry, adding, in the event a member is contained in the first directory entry, the current group of interest to a mapping for the member, determining whether the first directory entry contains a further directory entry, and reading, in the event a further directory entry is contained in the first directory entry, the further directory entry to determine whether the current group of interest is to be added to a mapping for another member and whether additional hierarchical directory data levels are to be traversed for the current group of interest.

In accordance with other aspects of this particular exemplary embodiment, the one or more directory entries may comprise at least one of: a user, a group, and a distribution list.

In accordance with further aspects of this particular exemplary embodiment, the techniques may further comprise repeating a traversal of one or more directory entries contained in hierarchical directory data for a second group of interest.

In accordance with additional aspects of this particular exemplary embodiment, the techniques may further comprise caching a list of identified users associated with a group membership map.

In accordance with additional aspects of this particular exemplary embodiment, the techniques may further comprise caching a list of identified distribution lists associated with a group membership map.

In accordance with additional aspects of this particular exemplary embodiment, the techniques may further comprise caching a list of identified groups associated with a group membership map.

In accordance with additional aspects of this particular exemplary embodiment, policies may be applied to groups of interest and a mapping of one or more members to a group of interest may improve performance associated with applying a policy.

In accordance with additional aspects of this particular exemplary embodiment, in the event a directory entry is available in cache, analysis is performed using the cache, and wherein in the event a directory entry is unavailable in cache, a query is made to the directory server.

In accordance with additional aspects of this particular exemplary embodiment, a directory entry is unavailable in cache if the directory entry is expired.

In accordance with additional aspects of this particular exemplary embodiment, directory entries in cache are expired based on an expiration time determined by a separate random value assigned to each directory entry, the random value distributing expiration times for the cached directory entries to reduce a load required to refresh expired directory entries in cache at a point in time.

In accordance with additional aspects of this particular exemplary embodiment, the data identifying one or more groups of interest of a directory server is received from an application and wherein at least one mapping of a member to a group of interest is provided to the application for application of a policy.

In accordance with additional aspects of this particular exemplary embodiment, the techniques may further comprise identifying a circular group relationship in the one or more directory entries contained in hierarchical directory data during traversal, and providing an alert containing data integrity error information associated with the circular group relationship to the administrator.

In accordance with additional aspects of this particular exemplary embodiment, the techniques may further comprise determining that the directory server is unavailable, and using the expired corresponding directory entry for directory data resolution.

In accordance with additional aspects of this particular exemplary embodiment, the directory server may be a LDAP compliant directory server.

In accordance with additional aspects of this particular exemplary embodiment, cached directory entries may be used concurrently by a process traversing hierarchical directory data to generate a mapping of one or more users to a group and by a directory data service client.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for directory data resolution, the article of manufacture comprising at least one processor readable medium, and instructions stored on the at least one medium, wherein the instructions are configured to be readable from the at least one medium by at least one processor and thereby cause the at least one processor to operate so as to receive data identifying one or more groups of interest of a directory server, traverse one or more directory entries contained in hierarchical directory data, the traversal starting at a directory entry corresponding to a current group of interest, read a first directory entry to identify a member contained in the first directory entry, add, in the event a member is contained in the first directory entry, the current group of interest to a mapping for the member, determine whether the first directory entry contains a further directory entry, and read, in the event a further directory entry is contained in the first directory entry, the further directory entry to determine whether the current group of interest is to be added to a mapping for another member and whether additional hierarchical directory data levels are to be traversed for the current group of interest.

In yet another particular exemplary embodiment, the techniques may be realized as a system for directory data resolution comprising one or more processors communicatively coupled to a network; wherein the one or more processors are configured to receive data identifying one or more groups of interest of a directory server, traverse one or more directory entries contained in hierarchical directory data, the traversal starting at a directory entry corresponding to a current group of interest, read a first directory entry to identify a member contained in the first directory entry, add, in the event a member is contained in the first directory entry, the current group of interest to a mapping for the member, determine whether the first directory entry contains a further directory entry, and read, in the event a further directory entry is contained in the first directory entry, the further directory entry to determine whether the current group of interest is to be added to a mapping for another member and whether additional hierarchical directory data levels are to be traversed for the current group of interest.

In accordance with additional aspects of this particular exemplary embodiment, the one or more directory entries may comprise at least one of: a member, a group, and a distribution list.

In accordance with additional aspects of this particular exemplary embodiment, the one or more processors may further be configured to repeat a traversal of one or more directory entries contained in hierarchical directory data for a second group of interest.

In accordance with additional aspects of this particular exemplary embodiment, in the event a directory entry is available in cache, analysis is performed using the cache, and in the event a directory entry is unavailable in cache, a query is made to the directory server.

In accordance with additional aspects of this particular exemplary embodiment, directory entries are expired based on an expiration time determined by a separate random value assigned to each directory entry, the random value distributing expiration times for the directory entries to reduce a load required to refresh expired directory entries at a point in time.

In accordance with additional aspects of this particular exemplary embodiment, the data identifying one or more groups of interest of a directory server is received from an application and wherein at least one mapping of a member to a group of interest is provided to the application to apply a policy.

In accordance with additional aspects of this particular exemplary embodiment, a directory entry available in cache is identified by a cache index using query filter token allowing directory entry matching using a full name derived from a local part of an email address.

In still another particular exemplary embodiment, the techniques may be realized as a method for directory data resolution comprising receiving a directory data query containing an email address, the directory data query directed to a directory server supporting a plurality of email aliases for en email address, querying the directory server using a query filter token allowing matching on a full name, wherein the query filter token replaces periods or underscores in a local part of an email address with a space to derive a fullname for querying, retrieving a directory entry corresponding to the fullname, and providing the directory entry to a requester.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 8 depicts a method of matching directory entries using query filter tokens in accordance with an embodiment of the present disclosure.

DETAILED DESCRIPTION OF EXEMPLARY EMBODIMENTS

Figure 1:
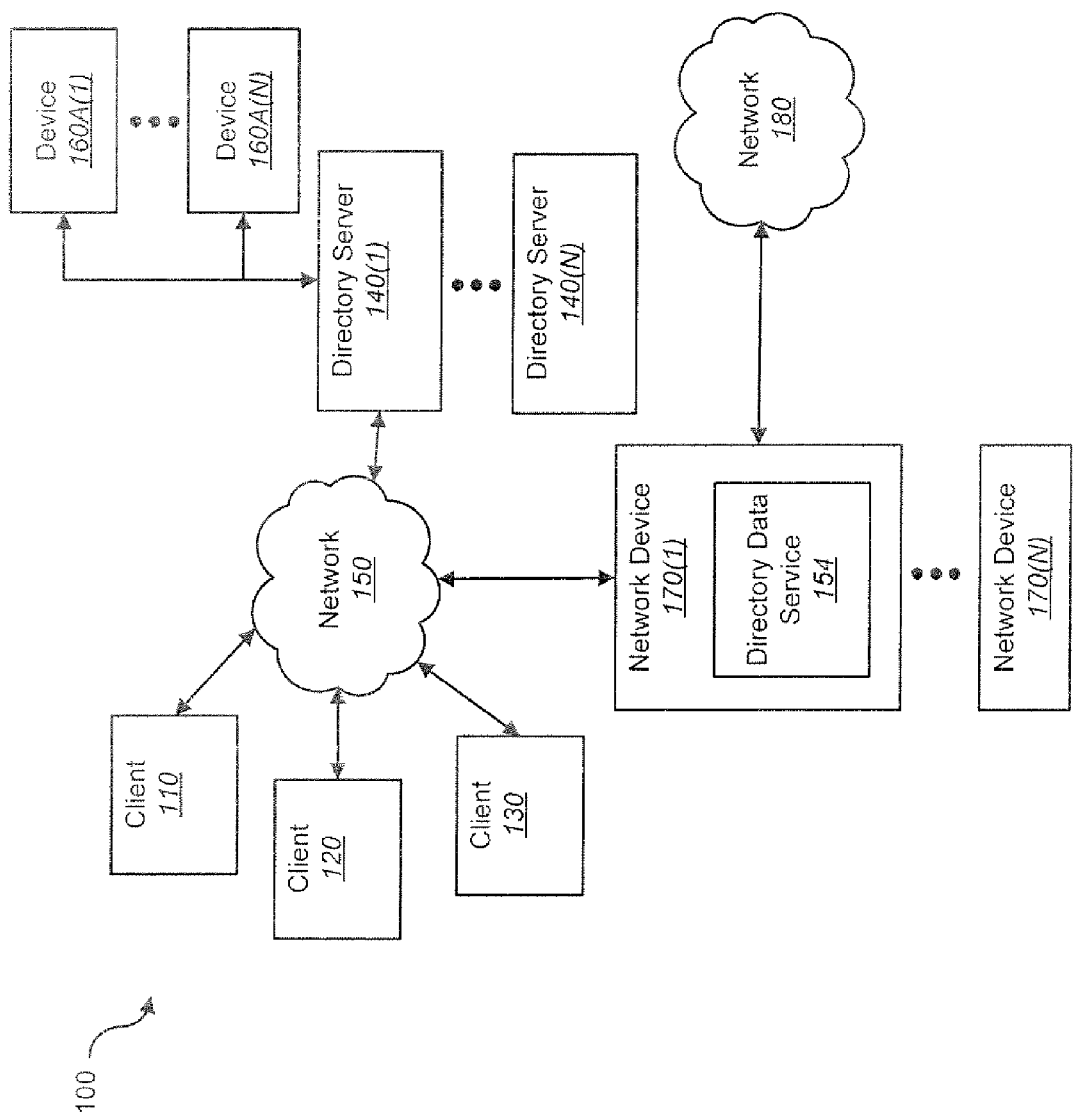
FIG. 1 shows a block diagram depicting a network architecture for directory data resolution in accordance with an embodiment of the present disclosure.

FIG. 1 shows a block diagram depicting a network architecture 100 for directory data resolution in accordance with an embodiment of the present disclosure. FIG. 1 is a simplified view of network architecture 100, which may include additional elements that are not depicted. Network architecture 100 may contain client systems 110, 120 and 130, as well as directory servers 140(1)-(N) and network devices 170(1)-(N) (one or more of which may be implemented using computer system 200 shown in FIG. 2). Client systems 110, 120 and 130 may be communicatively coupled to a network 150. Directory servers 140(1)-(N) may be communicatively coupled to storage devices 160(1)-(N). Network devices 170(1)-(N) may contain a management module (e.g., directory data service 154).

Figure 2:
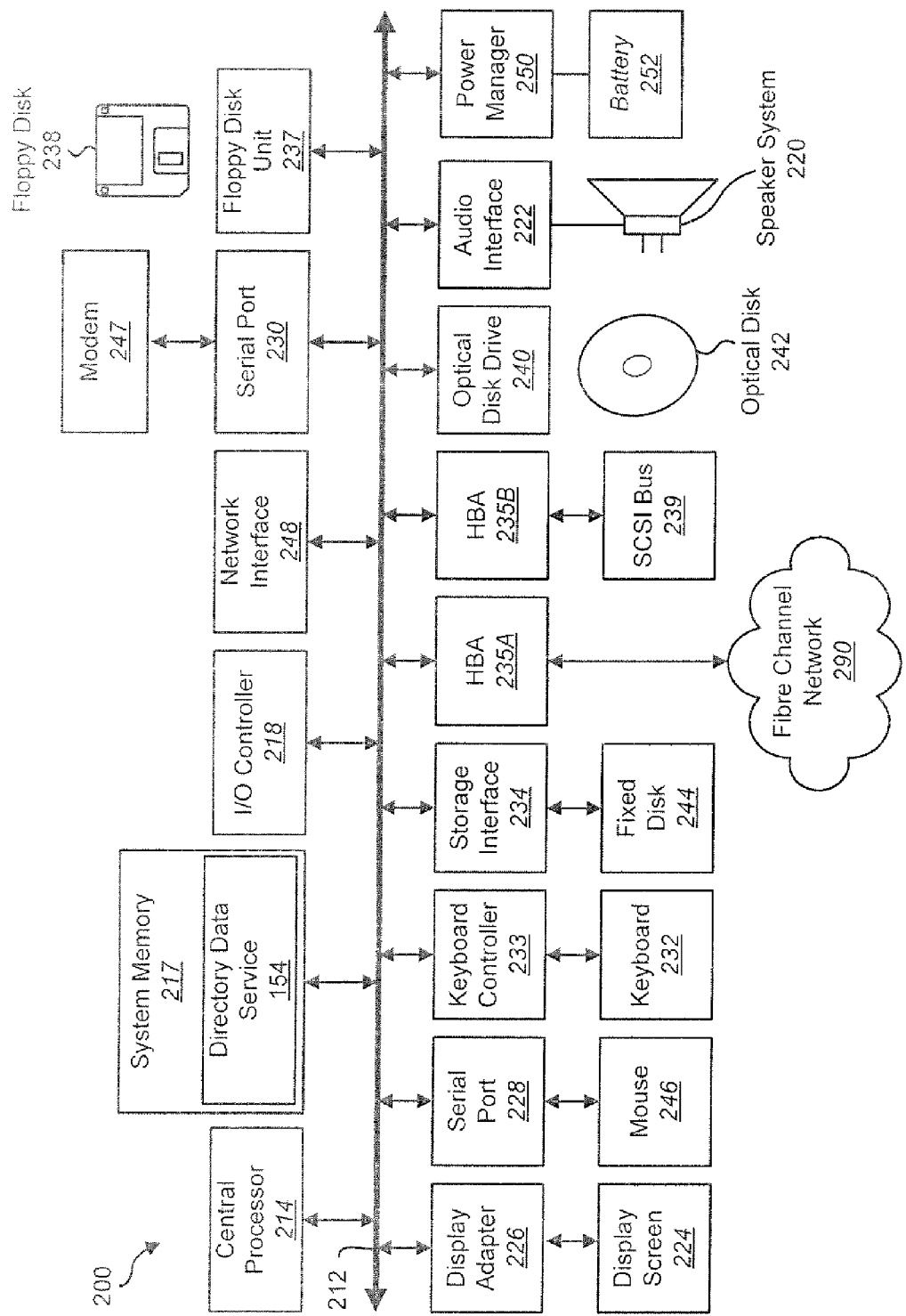
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on directory servers 140(1)-(N) using, for example, a Lightweight Directory Access Protocol (LDAP) client or other client software. Such a client may allow client systems 110, 120 and 130 to access data hosted by directory servers 140(1)-(N) or one of storage devices 160(1)-(N).

Networks 150 and/or 180 may be a local area network (LAN), a wide area network (WAN), the Internet, a cellular network, a satellite network, or another network that permits communication between clients 110, 120, 130, directory servers 140(1)-(N), and other devices communicatively coupled to networks 150 and/or 180. Networks 150 and/or 180 may further include one, or any number, of the exemplary types of networks mentioned above operating as a stand-alone network or in cooperation with each other. Networks 150 and/or 180 may utilize one or more protocols of one or more clients or servers to which it is communicatively coupled. Networks 150 and/or 180 may translate to or from other protocols to one or more protocols of network devices. Although networks 150 and 180 are each depicted as a single network, it should be appreciated that according to one or more embodiments, networks 150 and/or 180 may comprise a plurality of interconnected networks.

Storage devices 160(1)-(N) may be network accessible storage and may be local, remote, or a combination thereof to directory servers 140(1)-(N). Storage devices 160(1)-(N), may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160(1)-(N) may be used for backup or archival purposes.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

Directory servers 140(1)-(N) may be one or more of a host for directory data such as for example, a Microsoft® Active Directory® Server, an IBM® Lotus® Domino® Server, a Sun® Directory Server, a LDAP compliant directory server, a database server, a server containing one or more flat files or other data structures (e.g., XML), or other devices communicatively coupled to network 150. Directory servers 140(1)-(N) may utilize one or more of storage devices 160(1)-(N) for the storage of application data, backup data, or other data. One or more of directory servers 140(1)-(N) may be a host, such as an application server, which may process data requests for clients 110, 120, and 130.

According to some embodiments, network 180 may represent the Internet and network devices 170 may be devices handling a high volume of data traffic between network 150, which may be a corporate WAN or LAN, and network 180. For example, one or more of network devices 170 may be a mail gateway, a web gateway, or another appliance or application using directory data services for user authentication and/or authorization, identity management, recipient validation, address resolution, message routing, access control, or other application behavior. By way of non-limiting example, one or more of network devices 170 may be a Symantec® Brightmail® Gateway, a Symantec® Web Gateway, a Symantec® Data Loss Prevention Host, a Symantec® Endpoint Protection Application, or a Brightmail® Message Filter. One or more of network devices 170 may use directory data service 154 to manage cached data from one or more directory servers. According to some embodiments, each network device 170 may cache its own data. According to one or more embodiments, cached data may be shared among two or more of network devices 170. For example, network device 170(1) may be a control center host for a plurality of Brightmail Gateway scanners. The control center host may contain cached directory service data shared among a plurality of other network devices 170 which may be Brightmail Gateway scanners. Cached data may be stored on a network device 170 or in electronic storage communicatively coupled to a network device 170.

Directory data service 154 may be a component of a network device, a module, or another combination of hardware and software integrated to manage directory data cache operations. According to some embodiments, directory data service 154 may provide a unified service-oriented architecture for directory data integration with a gateway appliance, or another device or application using directory data services for high throughput processing.

Directory data service 154 may enable efficient directory data group resolution and cache management. Directory data service 154 may traverse one or more directory entries contained in a hierarchical directory server. The traversal may start at a current group of interest. If a directory entry is available in cache, analysis may be performed using the cache. If a directory entry is unavailable in cache, a query may be made to the directory server. If a directory entry is retrieved from the directory server, it may be written to cache. Directory data service 154 may read a first directory entry to identify a member contained in the first directory entry. If a member is identified, directory data service 154 may add the current group of interest to a mapping for the member. A mapping for a member may be a flat data structure showing one or more groups and/or distribution lists associated with a member. Directory data service 154 may determine whether the first directory entry contains a further directory entry (e.g., a further level of hierarchy below the present directory entry). Directory data service 154 may read a further directory entry contained in the first directory entry (e.g., a nested group) to determine whether the current group of interest is to be added to a mapping for another member (e.g., does a nested group contained in the further directory service entry contain a member to be mapped to a group of interest). Directory data service 154 may determine whether additional hierarchical directory data service levels are to be traversed for the current group of interest (e.g., there further levels of hierarchy to traverse down under the group of interest). According to some embodiments, directory data service 154 may cache a list of identified users associated with a group membership map, a list of identified distribution lists associated with a group membership map, and/or a list of identified groups associated with a group membership map. According to some embodiments, policies may be applied to groups of interest and a mapping of one or more members to a group of interest may improve performance associated with applying a policy. For example, data identifying one or more groups of interest within a directory server may be received from an application. One or more mappings of members to the identified groups of interest may be provided to the application for application of a policy.

According to some embodiments, cached entries may be used concurrently by a directory data service to generate a mapping of one or more users to a group and by a directory data service client.

According to some embodiments, groups, distribution lists, and other directory entries may expire. The expiration may be based on an expiration time determined by a separate random value assigned to each directory entry. The random value may distribute expiration times for the directory entries to reduce the chance that many expired entries will need to be refreshed concurrently, placing an inordinate load on the directory server.

Directory data service 154 may allow the management of cached data from a directory server such as for example, directory server 140(1). Directory data service 154 may also manage requests for directory services data. Caching data may allow faster performance for a network device such as a mail gateway and may offload burden from one or more directory servers 140. Building an initial cache may, however, pose a significant load. According to one or more embodiments, directory data service 154 may preload cached directory data prior to use by a network device. Cached data may need to be refreshed periodically so that the cached data does not become "stale" (e.g., omit changes to the directory data which may have occurred on a directory server.) A large number of cache entries may be created at a same time or within a same narrow time period. Setting a large number of cache entries a same Time To Live (TTL) setting or other similar setting which determines the expiration of the cache entry may result in a large number of queries to a directory server to refresh a large number of cache entries in a short time period. This undesirable behavior may cause a spike, performance problems, or other undesirable behavior on a directory server and/or on an application or device using a directory server.

According to one or more embodiments of the present disclosure, expiration times (e.g., TTL settings) of cached entries may be varied so that a large number of cached entries do not burden a directory server with refresh requests (e.g., LDAP queries to a LDAP compliant directory server) at a same point in time. For example, one or more parameters determining a range of permissible expiration times for a plurality of cached directory entries may be set by an administrator. Directory data service 154 may provide a user interface and/or accept set parameters. When a cached directory entry from a directory data service is created it may be assigned a creation directory data service 154. The cached directory entry may also be assigned one or more random values by directory data service 154. The one or more random values may determine an expiration time (e.g., a Time To Live (TTL) for the cached directory entry within the permissible range of expiration times. Randomizing the expiration time for the cached directory entry among the range of permissible expiration times for a plurality of cached directory entries may reduce an amount of synchronization (e.g., refresh requests) required between the cache memory of a network device 170 and a directory server 140 at a point in time. Thus, the cached entries may have their TTL settings distributed across a range of permissible time to live settings so that a directory server does not incur a performance spike or other degradation.

If a cache entry is expired, directory data service 154 may attempt to refresh the cache entry by querying a directory server (e.g., a LDAP query to LDAP compliant directory server). The cache entry may be received and updated or created in the cache with a new creation time set and a new TTL calculated.

According to some embodiments, if a directory data service is unavailable, an expired corresponding directory entry may be provided in response to a request. In the event a directory server is redundant to another directory server (e.g., they contain the same cache entries), a query to a directory server may fail over from the first server to the second server. For example, a round robin DNS (Domain Name Server) scheme may be used to failover to redundant directory servers. According to some embodiments, load balancing and/or failover may be implemented at a directory server (e.g., LDAP) tier. According to one or more embodiments, when there is a data access failure (e.g. network problem, or a directory server is down), directory data service 154 may service requests with data from the cache if it is available even if the cached data TTL has expired. For this reason, data may not be deleted from a data source cache unless size limits have been exceeded. For example, there may be a fast failover mode which may initiate when several data access failures have been detected in a short period of time. This may cause the data source to immediately serve up the cache data if it is available or to fail immediately with an exception (e.g., DataAccessUnavailableException). This may allow directory data service 154 to maintain high throughput when directory server resources are unavailable. According to an embodiment, a directory data service 154 fast failover configuration may be implemented as follows.

If five data access failures are detected in a period of 120 seconds, switch to fast-failover for 300 seconds. If there is no cached data to failover to for a particular request, the directory data service (DDS) call may fail with a transient error. For recipient validation, such transient errors may result in an SMTP error directing upstream senders to retry the message. For the other functions, these errors may cause messages to remain in various internal MTA (Message Transfer Agent) queues where they may be retried.

According to some embodiments, cache data may take precedence over a redundant directory data source. Setting an order of precedence among directory data sources and caches may be configurable. For example, consider the case where the system has been configured with two identical recipient validation sources, SourceA and SourceB, where SourceA is the first source in query order. Under normal circumstances, only SourceA may be queried for valid recipients. Under normal circumstances, both sources may be queried for invalid recipients. If SourceA is down, cached valid recipients may be served from the SourceA cache, Source B may not be consulted. If SourceA is down, uncached valid recipients may be served from SourceB. Sticky refresh may cause them to be subsequently served from SourceB. If SourceA is down, cached-but-unexpired invalid recipients may be handled the same as under normal circumstances. If SourceA is down, uncached or cached-but-expired invalid recipients may cause an error instructing a requestor to try again later.

According to some embodiments, if SourceB is down, cached valid recipients may be served from the SourceA cache, Source B may not be consulted. If SourceB is down, uncached valid recipients may be served from SourceA. Early termination and sticky refresh may cause them to be subsequently served from SourceA. Early termination may be the termination of a search against a directory data service configured with multiple data sources without verifying the uniqueness of the search results (e.g., in the case of recipient validation the search may stop at a first data source in which the requested directory entry is found). Sticky refresh may be a preference defined under which a directory entry in a cache is associated with a particular data source and the directory data service attempts to refresh the directory entry from that same data source when the directory entry expires (e.g., as long as the directory entry may be refreshed from the same data source, other data sources in the system will not be queried for it). If SourceB is down, cached-but-unexpired invalid recipients may be handled the same as under normal circumstances.

If SourceB is down, uncached or cached-but-expired invalid recipients may cause an error directing a requestor try again later.

According to some embodiments, redundant sources may not be supported. When a directory data source is down it may fail over to cache data if it is available. If there is no cache data to use, the source may log a data access error and directory data service 154 may generate a data access alert. However directory data service 154 may continue to search other data sources. If a unique entry is found in one of the healthy sources, the call may succeed and sticky refresh may direct subsequent requests for that entry to that source. If more than one entry is found, a uniqueness error may be logged and directory data service 154 may generate a data integrity alert. If no matching entries are found, a request may fail with a transient error code and may be retried.

According to some embodiments, directory data service 154 may detect one or more data integrity errors, or other errors and may provide logging and/or alerting associated with the errors. For example, directory data service 154 may encounter data errors during processing and may log the errors and/or provide an alert to an administrator. Detected data errors may include, by way of non-limiting example, email address non-uniqueness, username non-uniqueness, missing or invalid attribute data (e.g., missing email address, invalid email address format, group membership attribute referring to a non-existent entry, and inconsistent values for child and parent group membership attributes), and circular group relationships. Directory data service 154 may integrate with a variety of directory data. For example, directory data service 154 may access directory servers 140(1) . . . (N), which may be LDAP directories, SQL databases, and/or servers containing flat files. Directory data service 154 may access a directory server (e.g., a LDAP query) seeking an email address or other data. Based on received data, directory data service 154 may detect a data integrity error. A received email address may correspond to multiple directory entries in a single data source or a username may correspond to multiple directory entries in a single data source. According to some embodiments, in addition to data integrity errors, other errors recognized by directory data service 154 may handle errors including: directory data access errors (e.g., failed to read data from a LDAP server), an undersized data source cache error (e.g., indicates that a data source cache or cache index is not large enough to hold all of the requested data or fetched directory entries in memory), and/or an (end user preference replication error (indicates that an end user preference replication operation has failed).

Directory data service 154 may provide alerts for events including: a service is not responding or working, a service start after an improper shutdown, a service shutdown, and a service start. In addition to these alerts, directory data service 154 may handle directory data service (DDS) specific alerts. Directory data service 154 may provide directory server data access alerts. This type of alert may be triggered when the directory data service 154 cannot read data from an directory server (e.g., a LDAP server). This may occur for a wide variety of reasons. Some examples may include: a LDAP server is down, network infrastructure problems, DNS issues, firewall rules blocking requests, bad data source admin bind credentials, and/or a LDAP search timeout.

Other alerts handled by directory data service 154 may include directory server data integrity alerts. This type of alert may be triggered when directory data service 154 has detected a problem with directory data that prevents the successful execution of a request. Data integrity issues that do not result in the failure of requests may be logged by directory data service 154 at a "WARNING" level and may not trigger alerts. Directory data service 154 may log recipient validation errors. If multiple entries are returned for a search on the recipient address (within a single data source or across multiple sources), the event may be logged by directory data service 154 an "INFO" level, and no alert may be generated. Duplicate recipients may be considered valid for the purposes of the recipient validation function.

The following data integrity errors may trigger an alert:

More than one entry is returned for a search on an email address (within a single data source or across multiple sources).

More than one entry is returned for a search on a username (within a single data source or across multiple sources).

The following data integrity issues may be logged by directory data service 154 at "WARNING" level, and may not trigger alerts: circular group references, invalid group membership attribute values, missing primary email attribute value, and/or invalid format for email address value.

Circular group references may be recognized by directory data service 154 when a directory server is being traversed from the top down to determine group membership. For example if group A is a member of group B and group B is a member of group A, directory data service 154 may detect this and log an error. Group relationships may be nested many levels deep so a circular group reference may occur several levels down. For example, assuming groups are nested from parent through child from A-E, group B may be member of group E causing a circular group reference. According to some embodiments, a recursive tree traversal algorithm may be used that may determine that a particular node of a tree (i.e., a group) has been visited before. This may indicate a circular group reference. Circular group references may be detected with in a data source (e.g., a single directory server) or across data sources.

Directory data service 154 may also provide directory data service (DDS) Cache Size Alerts. This type of alert may be triggered when directory data service 154 evicts a cache entry before it is expired to make room for a new entry that has been fetched from the data access layer. The alerts and log statements may steer the administrator to take the appropriate action. Exemplary alerts include:

Entry Cache remedy: increase cache size

Recipient Ref Cache (Cache Index on Email Address)

remedy: increase cache index size multiplier (i.e., a parameter determining the size of a cache index; e.g., a parameter N which sets the cache index size=(N×cache size).

User Ref Cache (Cache Index on Username)

remedy: increase cache index size multiplier

Alert files may communicate the host, the specific type of alert condition, and the time of the triggering incident. The alert text may direct administrators to the system log files for additional diagnostic information. This may allow change extension of functionality of the alerts with less impact.

Generated alert emails may contain the following information:

The timestamp of the alert event;

The host identifier for the alert event;

The component that generated the alert event (e.g., directory data service 154); and A localized message corresponding to a predefined directory data service status code.

The status codes may be coarse-grained and there may be many possible error conditions that could result in a particular code. The alert mechanism may simply communicate that the directory data service instance on a particular host was unable to process requests at a particular time, and may refer the administrator to the logs for detailed information about a root cause.

There may be user interface elements (e.g., checkboxes) to enable or disable one or more subtypes of directory data access alerts, directory data integrity alerts, directory data service cache size alerts, user preference replication alerts, or other types of alerts.

Directory data service 154 may log one or more data integrity errors or other errors and alerts may be generated by a separate mechanism. For example, directory data service 154 create an alert file on disk or in other electronic storage. The alert file may contain a timestamp and an identifier indicating a type of alert condition. A process or agent running on network device 170 may periodically poll for alert files, process alert metadata, and send an alert email to one or more users (e.g., registered system administrators). Other communication channels may be used to notify a user including, but not limited to: SMS text messages, voicemail, and/or a webpage posting. According to some embodiments, directory data service 154 may send an alert directly without the use of an additional process or agent. According to one or more embodiments, directory data service 154 or another process may send an alert using an interface (e.g., via SNMP, a Windows System Event, or a custom IPC (inter-process communication)).

Detection of data integrity errors by directory data service 154 and prompt alerting of a system administrator may enable a system administrator to address issues prior to system degradation or failure.

According to some embodiments, directory data service group resolution may be performed to aid one or more application functions. For example, a mail gateway may wish to determine membership of one or more groups of interest to determine which policy to apply to a user. Resolving all groups may put an unnecessary and heavy burden on a directory server. For example, according an exemplary embodiment, a mail gateway may only need to resolve group memberships that intersect with policy group memberships (e.g., policy group memberships stored in a configurable list such as bmiconfig.xml). Run-time group membership expansion may be limited to child memberships of distribution lists (when distribution expansion is enabled), according to some embodiments. Downward expansion of distribution lists and groups included as members of policy groups in a configurable list (e.g., bmiconfig.xml) may be performed ahead of accepting address resolution calls from directory data service clients. No 'upward' expansion of parent memberships may be performed. This may provide several benefits:

Speeding up address resolution tremendously for all directory types, not just the ones lacking a member of attribute;

Speeding up user membership resolution, not just distribution list expansion;

Tangibly speeding up cached distribution list expansion; and

Lowering memory overhead significantly by dropping the number of dlists and groups cached to only those referenced in policies and/or receiving messages.

Resolving policy group memberships may take several seconds to a few minutes: while the downward-only expansion model may speed up distribution list expansion by several orders of magnitude, it may still take a non-negligible about of time to resolve all dlists and groups to populate the cache. During this time, address resolution calls may be queued.

Cache expiration of resolved dlists and groups may be refreshed by a thread based on a minimum TTL. Any add or edit to bmiconfig.xml policy group memberships, or directory data source configuration change, may trigger re-resolution of groups.

Downward membership expansion algorithm may start with a list of email addresses and LDAP group distinguished names (DNs) as obtained from the policy memberships listed in /data/scanner/etc/bmiconfig.xml. Each LDAP group DN may be added to the list of groups to be. For each fully-formed email address (localpart@domain.com), EntryDAO may be used to determine if the email address corresponds to a dlist, and if so, add it to the list of groups to be expanded. Other policy membership forms (e.g., domain-only, file-globbing patterns) may be skipped.

Whether a directory entry is a distribution list or email-less LDAP group, the next steps may be the same:

for each group to be expanded
    retrieve group entry from LDAP server
        cache entry (DN, primary/alias
email addresses, and/or child memberships)
    for each child member
        add original group from
bmiconfig to child's parental membership
    recursively expand child member Note that where a member of a group is already cached by virtue of a previously-resolved group, the parent membership may be added to, not replaced, and the cached entry may be retained. Note also that the logic for handling circular group memberships may be to stop expanding when an already-seen node is encountered.

For example, if we have the following entries in the LDAP server:

```
dn:      uid=user.1,              dn:      cn=dlist.1,
dc=brightmail, dc=com              dc=brightmail, dc=com
objectClass: person                objectClass: groupOfNames
mailAlternateAddress:              mail: dlist.1@brightmail.com
user.1.alias@brightmail.com        member:
mail: user.1@brightmail.com        uid=user.l, dc=brightmail, dc=com
                                   member:
dn:      uid=user.2,               uid=user.2, dc=brightmail, dc=com
dc=brightmail, dc=com
objectClass: person                dn:      cn=dlist.2,
mail: user.2@brightmail.com        dc=brightmail, dc=com
                                   objectClass: groupOfNames
dn:      uid=user.3,               mail: dlist.2@brightmail.com
dc=brightmail, dc=com              member:
objectClass: person                cn=dlist.1, dc=brightmail, dc=com
mailAlternateAddress:              member:
user.3.alias@brightmail.com        uid-user.3, dc=brightmail, dc=com
mail: user.3@brightmail.com
                                   dn:      cn=group.1,
                                   dc=brightmail, dc=com
                                   objectClass: groupOfNames
```

-continued

```
        member:
            uid=user.2, dc=brightmail, dc=com
        member:
            uid=user.3, dc=brightmail, dc=com
```

And two policy memberships listed in bmiconfig.xml:
   dlist.2@brightmail.com
   cn=group.1,dc=brightmail,dc=com Then at the completion of the downward membership resolution task, we would have the following entries in the directory data service cache:

| Users | Distribution Lists | Groups |
|---|---|---|
| unqiueid:<br>  uid=user.1,<br>dc=brightmail, dc=com<br>primary:<br>user.1@brightmail.com<br>aliases:<br>user.1.alias@brightmail.com<br>member of:<br>  dlist.2@brightmail.com | unqiueid:<br>  cn=dlist.1,<br>dc=brightmail, dc=com<br>primary:<br>dlist.1@brightmail.com<br>member of:<br>dlist.2@brightmail.com<br>child members:<br>  uid=user.1<br>  uid=user.2 | unglueId:<br>cn=group.1, dc=brightmail, dc=com<br>child members:<br>  uid=user.2<br>  uid=user.3 |
| unqiueId:<br>  uid=user.2,<br>dc=brightmail, dc=com<br>primary:<br>user.2@brightmail.com<br>member of:<br>  dlist.2@brightmail.com<br>cn=group.1, dc=brightmail, dc=com<br>unqiueid:<br>  uid=user.3,<br>dc=brightmail, dc=com<br>primary:<br>user.3@brightmail.com<br>aliases:<br>user.3.alias@brightmail.com<br>member of:<br>  dlist.2@brightmail.com<br>cn=group.1, dc=brightmail, dc=com | unqiueId:<br>  uid=dlist.2,<br>dc=brightmail, dc=com<br>primary:<br>dlist.2@brightmail.com<br>child members:<br>  cn=dlist.1<br>  uid=user.3 | |

For example, when a group or distribution contains a child membership where the DN of the child member is outside the base DN of the source, the membership may nonetheless be traversed and cached.

Membership Cache Design

The parent membership information for one or more Entry types (user, DistributionList, Group) may be separated into a separate, map-backed cache, where the key is the uniqueId of the Entry, and the value is a List of the uniqueId's of the group(s) and dlist(s) of which that Entry is a member.

Resolving an Entry from the cache may now incur a new step: if the uniqueId is found to exist in the main cache, a second lookup may be performed on the map-backed membership cache. If there is no key for the uniqueId, there may be no parent group membership to report for that entry.

Note that Entries with parent membership of interest to directory data service clients may be cached after the downward membership expansion task has completed. While each Entry in the main cache may have its own time-to-live (TTL), the entire membership map may be considered to have a single TTL, which may be set to the minimum range TTL for the data source. Consequently, the following use cases may be encountered when an address resolution entry is fetched when servicing a directory data service client address resolution request:

The Entry was not yet cached. Therefore, the Entry may have no parent membership, and the LDAP server may be queried for the email addresses and child membership only.

The Entry is cached, and may or may not have parent membership.

The Entry is cached, but the TTL for the Entry is expired, therefore the LDAP server may be queried for the email addresses and child membership only and the cached Entry may be replaced. If the Entry has parent membership, it may be re-linked by virtue of the uniqueId (DN).

Membership Cache Rebuild Task

When the directory data service server is started for the first time, or when the server is restarted, the entire membership map may be rebuilt for a given source if cache persistence is not enabled.

When the directory data service server receives a kick command, and the bmiconfig.xml file contains a change to policy membership lists the entire membership map may be rebuilt for a given source.

When the directory data service server receives a kick command, and the ddsconfig.xml file contains a change to a data source that requires the cache for that source to be rebuilt the entire membership map may be rebuilt for a given source.

When the TTL for the membership map has expired, in order to capture addition and removal of group members in the LDAP server directory tree the entire membership map may be rebuilt for a given source.

The directory data service server may block address resolution calls and while the membership map is being rebuilt. If a kick or clear cache command is received while a membership map build task is in progress for a relevant source, the task may be abandoned, and the kick command may be processed.

The rebuild task may build a new membership map while retaining the old copy, so that address resolution calls may continue to be serviced while the map is rebuilt, and so that in failure cases, it may revert to the old copy. This means that during rebuild, the membership map may peak at 2× memory consumption of the single map, and that the actual time during which address resolution calls are queued when there is an old map available may be negligibly longer than for an ordinary directory data service kick.

To address rebuild when the TTL for the membership map expires, there may be a scheduled task for each address resolution source, operating on an interval set to the lower TTL range value for the source. When the membership map's TTL has expired, the rebuild task may be invoked. If an Entry referred to by the downward expansion is already cached, the TTL of that entry may be examined. If expired, the Entry and its child membership data may be fetched from the Data Access Layer and cached anew. If not expired, the old Entry may be retained, and the Entry's child membership data represented in the new map. Membership map data may persist longer than the maximum TTL range. For example, if the minimum TTL range is set to 1 hour, and the maximum to 5.5 hours, then the membership map may be rebuilt up to six times before a particular Entry expires, thus that Entry child membership data may remain cached for 6 hours.

The rebuild task may employ a pool of threads to process tile list groups and dlists from the bmiconfig.xml in parallel. Cache statistics may be updated in response to additions, replacements, and evictions.

Directory data service API behavior during membership cache rebuild:

During the membership map rebuild for any address resolution source, the directory data service server may be prevented from servicing any client address resolution calls, or invoking an overlapping kick. Note that other directory data service calls (e.g., recipient validation) may be executed while the address resolution membership cache is being rebuilt.

When a new membership cache is being built, and a previous maps exists, address resolution calls may still be serviced by the directory data service. When no previous membership map exists, address resolution calls may be queued, and the time needed to build the initial map may result in address resolution calls being queued (e.g., many large groups in bmiconfig.xml and/or slow-responding LDAP server).

When a kick or clear cache command is received during membership map building, the building may be abandoned, the kick or clear cache command serviced, and then the membership map build restarted if necessary. The 'older' bmiconfig.xml and ddsconfig.xml may be kept to determine if membership needs to be rebuilt, and TTL of 'old' map may be examined to determine if it has expired. Clear cache on a source may result in a membership map rebuild for that source. This handles the cases where membership map rebuild is in progress (either initial build, or with a previously existing map) and:

a kick is received in response to change to ddsconfig.xml (source add/edit/delete, cache persistence change, directory data service log level change)

change to bmiconfig.xml (add/remove LDAP policy membership) userprefs.xml replication "Clear Cache" may be invoked for the source for which the membership map is being built.

Distribution List Policy Members Referred by Email Address

In order to be included in a data source's membership map, a policy member email address may be resolvable by the data source address resolution query, thus it may be within the scope of the base DN, and findable using the query filter.

When a distribution list is listed in a policy using the distinguished name (DN) of its LDAP entry, the membership may be evaluated even if the entry is outside the scope of the data source (e.g., the base DN of the source is ou=Americas, dc=company,dc=com, and the DN of the distribution list is cn=all-sales-dlist,ou=groups,dc=company,dc=com). This is because, when an entry is retrieved using its DN, the entry DN replaces the base DN in the LDAP query for a 'scope base' search with '(objectclass=*)' as the search filter.

Cache Eviction, Size, Effect of Disable

When a source's cache is undersized and full, and an attempt to cache a new Entry occurs, an Entry may be evicted based on a least recently used (LRU) algorithm. The membership cache map may be unlimited in size, but it may be possible to hit the cache limit during the downward expansion task (e.g., cache limit is 10,000 and the total number of entries referenced by groups in bmiconfig.xml is 12,000). We may allow the regular com.symantec.sms.dds.cache.LRUHashMap eviction to occur, but since the membership map is separate and unlimited, the functionality of the downward expansion may be preserved.

The membership cache may be populated, and minimum TTL setting may continue to govern the scheduled membership cache rebuild, even when the main cache for the source is disabled (or set to a size of zero).

Failover to expired cache data behavior

Failing over to expired cached data may occur if the LDAP server is inaccessible.

If the LDAP source is inaccessible at any time during downward membership cache rebuild, we may fail back to the previous membership map, issue a data access alert, and retry at an interval of 30 seconds. If there is no previous map to fall back on (i.e., the map is being built on the initial source save, as a result of change to the source configuration, or as a result of a cache clear command), then the address resolution calls may be queued.

Failover to a previous map may not occur if a dlist or group listed in bmiconfig.xml is no longer visible in the LDAP server (e.g., query successful, but null result, due to entry being deleted or moved, or access control changing), but we may log at 'INFO' level listing the source name and group not found.

Cache Persistence

The membership map-hacked cache may be persisted to disk along with other cache data, in accordance with the cache persistence Boolean setting.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, directory data service 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
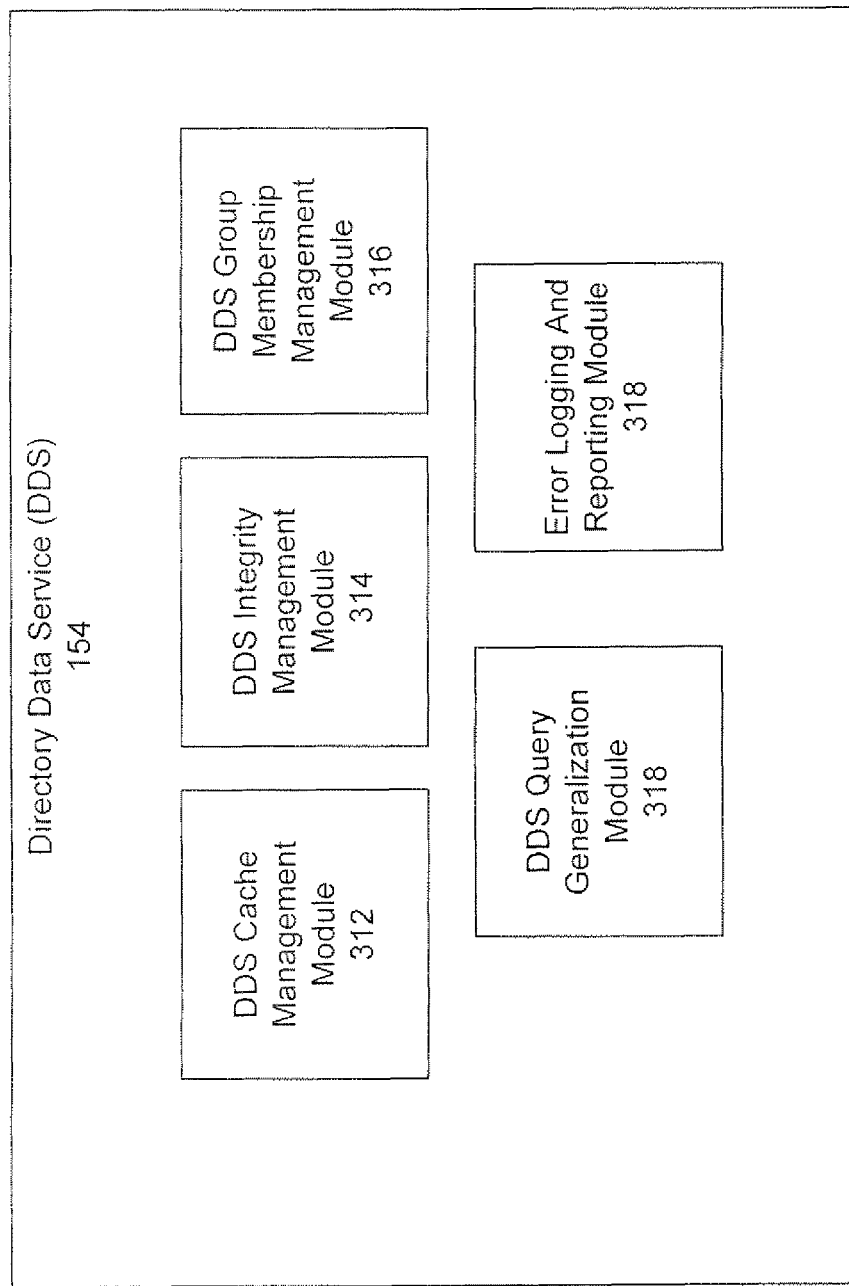
FIG. 3 shows a module for directory data resolution in accordance with an embodiment of the present disclosure.

Referring to FIG. 3, there is shown a directory data service 154 in accordance with an embodiment of the present disclosure. As illustrated, the directory data service 154 may contain one or more components including directory data service (DDS) cache management module 312, directory data service integrity management module 314, directory data service group membership module 316, directory data service query generalization module 318, and error logging and reporting module 318.

The description below describes network elements, computers, and/or components of a system and method for directory data resolution that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Directory data service (DDS) cache management module 312 may handle one or more aspects of cache management. For example, DDS cache management module 312 may receive, calculate, and/or set TTL settings, TTL ranges, or other cache expiration parameters. DDS cache management module 312 may determine when to expire a cache entry based on one or more TTL parameters, a creation time of the cache entry, elapsed time since a creation time, and/or other factors.

DDS cache management module 312 may determine failover behavior based on one or more settings and/or detected conditions. DDS cache management module 312 may receive, set, and/or enforce settings for an order of precedence between data sources and/or cache.

Directory data service integrity management module 314 may detect one or more data integrity errors or other errors and may provide logging and/or alerting associated with the errors. For example, directory data service integrity management module 314 may encounter data errors during processing and may log the errors and/or provide an alert to an administrator. Detected data errors may include, by way of non-limiting example, email address non-uniqueness, username non-uniqueness, missing or invalid attribute data (e.g., missing email address, invalid email address format, group membership attribute referring to a non-existent entry, and inconsistent values for child and parent group membership attributes), and circular group relationships. Directory data service integrity management module 314 may integrate with a variety of directory data. For example, directory data service integrity management module 314 may access directory servers 140(1) ... (N), which may be LDAP directories, SQL databases, and/or servers containing flat files. Directory data service integrity management module 314 may access a directory server (e.g., a LDAP query) seeking an email address or other data. Based on received data, directory data service integrity management module 314 may detect a data integrity error. A received email address may correspond to multiple directory entries in a single data source or a username may correspond to multiple directory entries in a single data source or multiple data sources. According to some embodiments, in addition to data integrity errors, other errors recognized by directory data service integrity management module 314 may include: directory data access errors (e.g., failed to read data from a LDAP server that was offline), an undersized data source cache error (e.g., indicates that a data source cache or cache index is not large enough to hold all of the requested data in memory), and/or an end user preference replication error (indicates that an end user preference replica on operation has failed).

Circular group references may be recognized by directory data service integrity management module 314 when a directory server is being traversed from the top down to determine group membership. For example if group A is a member of group B and group B is a member of group A, directory data service integrity management module 314 may detect this and log an error. Group relationships may be nested many levels deep so a circular group reference may occur several levels down. For example, assuming groups are nested from parent through child from A-E, group B may be member of group B causing a circular group reference. According to some embodiments, a recursive tree traversal algorithm may be used that may determine that a particular node a tree (i.e., a group) has been visited before. This may indicate a circular group reference. Circular group references may be detected with in a data source (e.g., a single directory server) or across data sources. During group resolution circular group references may be identified and/or logged. One more alerts may be generated.

Directory data service integrity management module 314 may log one or more data integrity errors or other errors and alerts may be generated by a separate mechanism. For example, directory data service integrity management module 314 may create an alert file on disk or in other electronic storage. The alert file may contain a timestamp and an identifier indicating a type of alert condition. A process or agent running on network device 170 may periodically poll for alert files, process alert metadata, and send an alert email to one or more users (e.g., registered system administrators). Other communication channels may be used to notify a user including, but not limited to: SMS text messages, voicemail, and/or a webpage posting. According to some embodiments, directory data service 154 may send an alert directly. According to one or more embodiments, directory data service integrity management module 314 or another process, component, or module may send an alert using an interface (e.g., via SNMP, a Windows System Event, or a custom IPC (inter-process communication)).

Detection of data integrity errors by directory data service integrity management module 314 and prompt alerting of a system administrator may enable a system administrator to address issues prior to system degradation or failure.

Directory data service group membership module 316 may traverse a directory server to identify members of a group. Directory data service group membership module 316 may resolve parent group memberships, child group memberships, or both.

Directory data service group membership module 316 may enable efficient directory data group resolution and cache management. Directory data service group membership module 316 may traverse one or more directory entries contained in hierarchical directory data. The traversal may start at a current group of interest. If a directory entry is available in cache, analysis may be performed using the cache. If a directory entry is unavailable in cache, a query may be made to the directory server. If a directory entry is retrieved from the directory server, may be written to cache. Directory data service group membership module 316 may read a first directory entry to identify a member contained in the first directory entry. If a member is identified, directory data service group membership module 316 may add the current group of interest to a mapping for the member. A mapping for a member may be a flat data structure showing one or more groups and/or distribution lists associated with a member. Directory data service group membership module 316 may determine whether the first directory entry contains a further directory entry (e.g., further levels of hierarchy below the present directory entry). Directory data service group membership module 316 may read a further directory entry contained in the first directory entry (e.g., a nested group) to determine whether the current group of interest is to be added to a mapping for another member (e.g., does a nested group contained in the further directory service entry contain a member to be mapped to a group of interest). Directory data service group membership module 316 may determine whether additional hierarchical directory data service levels are to be traversed for the current group of interest (e.g., a there further levels of hierarchy to traverse down under the current group of interest). According to some embodiments, directory data service group membership module 316 may cache a list of identified users associated with a group membership map, a list of identified distribution lists associated with a group membership map, and/or a list of identified groups associated with a group membership map. According to some embodiments, application policies may be applied to groups of interest and a mapping of one or more members to groups of interest may improve performance associated with applying a policy. For example, data identifying one or more groups of interest of a directory server may be received from an application. One or more mappings of members to the identified groups of interest may be provided to the application for application of a policy.

According to some embodiments, cached directory entries may be used concurrently by a directory data service to generate a mapping of one or more users to a group and by a directory data service client.

According to some embodiments, groups, distribution lists, and other cached directory entries may expire. The expiration may be based on an expiration time determined by a separate random value assigned to each directory entry. The random value may distribute expiration times for the directory entries to reduce the chance that many expired entries will need to be refreshed concurrently, placing an inordinate load on the directory server.

Directory data service query generalization module 318 may allow a query (e.g., a LDAP query) to a directory server to use query filter tokens or other mechanisms to match a variety of directory data aliases. Query filter tokens and alias matching are discussed in greater detail below in reference to FIG. 8.

Error logging and reporting module 318 may produce logs, reports, or other information associated with directory data resolution.

Figure 4:
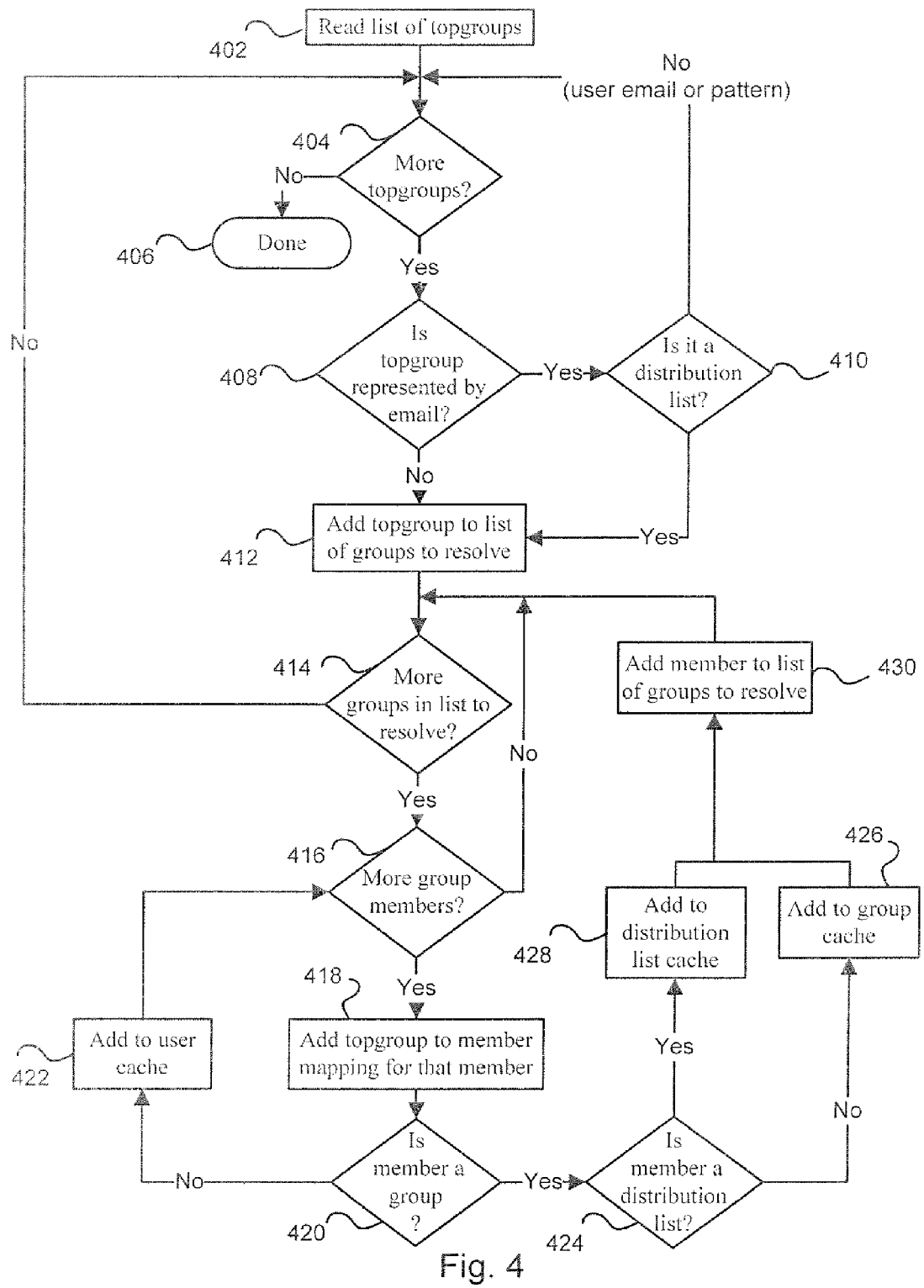
FIG. 4 depicts a method for directory data resolution in accordance with an embodiment of the present disclosure.

Referring to FIG. 4, there is depicted a method 400 for directory data resolution in accordance with an embodiment of the present disclosure. At block 402, a list of top groups may be read. A 'top group' may be a group of interest as previously defined in this disclosure.

At block 404, it may be determined if there are one or more top groups to be processed. If one or more top groups on the list remain to be processed, the method 400 may continue at block 408. If no top groups remain to be processed, the method may end at block 406.

At block 408, it may be determined whether a top group is represented by an email address or another type of unique identifier in the list. If a top group is represented by an email address, the method may continue at block 410. If a top group is not represented by an email address, the method may continue at block 412.

At block 410, it may be determined whether a top group is a distribution list. If a top group is a distribution list, the method may continue at block 412. If a top group is not a distribution list, the method may return to block 404.

At block 412, a top group may be added to a list of groups to be processed for further resolution.

At block 414, the method may determine whether there are more groups to be resolved. If more groups remain to be resolved, the method may continue at block 416. If no more groups remain in a list of groups to be resolved, the method may return to block 404.

At block 416, a group may be resolved to determine if there are any group members. If there are group members, the method may continue at block 418. If there are no more group members the method may return to block 414.

At block 418, a top group may be added to a mapping for an identified group member.

At block 420, the identified group member may be analyzed to determine whether the member is a group (e.g., a further level of nesting). If the member is a group the method may continue at block 424. If a member is not a group the method may continue at block 422.

At block 422, the identified group member may be a user who may be added to a user cache.

At block 424, the method may determine whether the group member is a distribution list or a group. If the group member is a distribution list the method may continue at block 428. If the member is a group, the method may continue at block 426.

At block 426, the group may be added to a group cache.

At block 428, the distribution list may be added to a distribution list cache.

At block 430, the group member (i.e., either a distribution list or a group) may be added to a list of groups to resolve (e.g., perform another iteration to resolve the nested distribution list or group). The method may continue at block 414. The group resolution process may end when no more top groups remain to be resolved at block 406.

Figure 5:
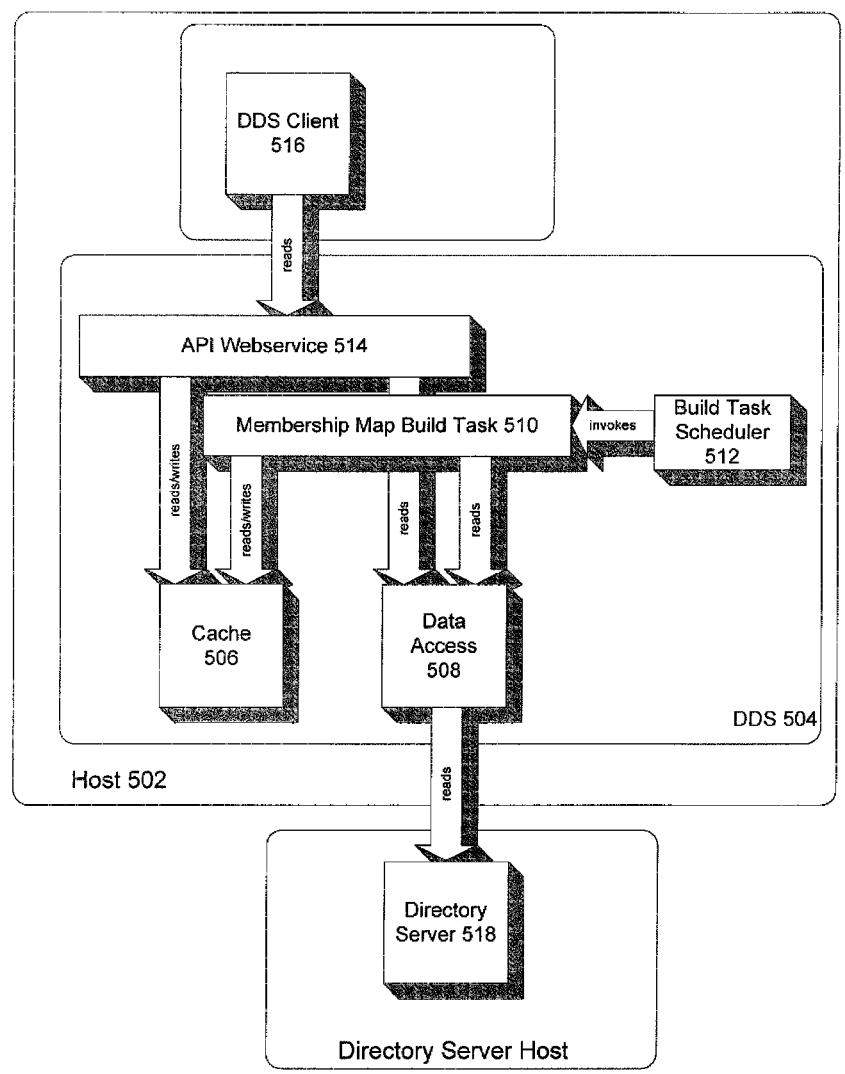
FIG. 5 depicts a block diagram illustrating components for directory data resolution in accordance with an embodiment of the present disclosure.

Referring to FIG. 5, there is depicted a block diagram illustrating components for directory data resolution module in accordance with an embodiment of the present disclosure. As illustrated host 502 (e.g., a gateway appliance) may contain a directory data module 504 which may contain cache 506, data access layer 508, membership map build task 510, build task scheduler 512, and API webservice 514. API webservice 514 and membership map build task 510 may concurrently access cache 506 and data access layer 508. Data access layer 508 may provide access to directory server 518. Membership map build task 510 may provide one or more interfaces to cache 506 and data access layer 508 for build task scheduler 512. API webservice 514 may provide one or more interfaces to cache 506 and data access layer 508 for directory data services client 516.

Figure 6A:
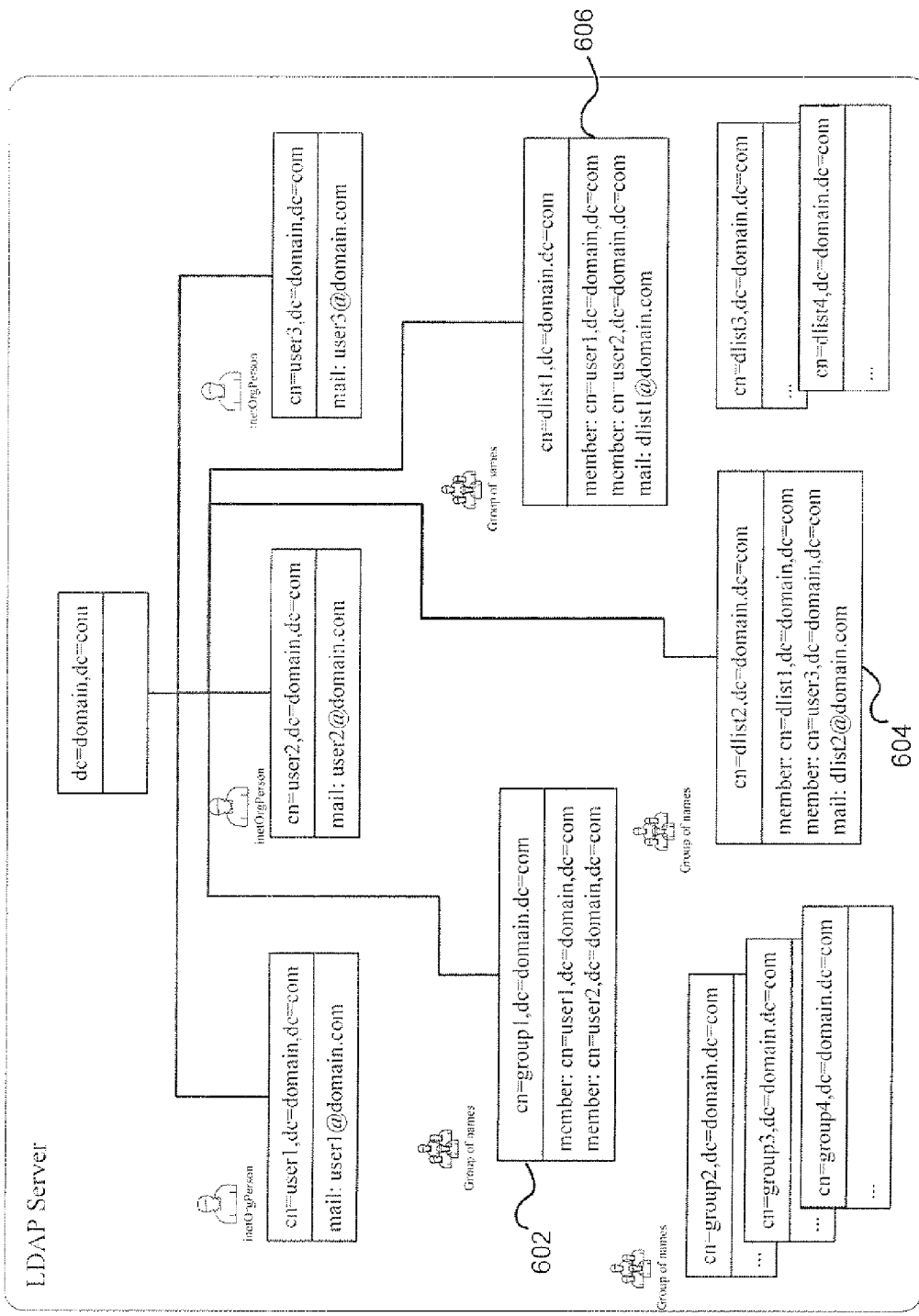
FIGS. 6A, 6B, and 6C depict directory data structures in accordance with an embodiment of the present disclosure.
Figures 6B, 6C:
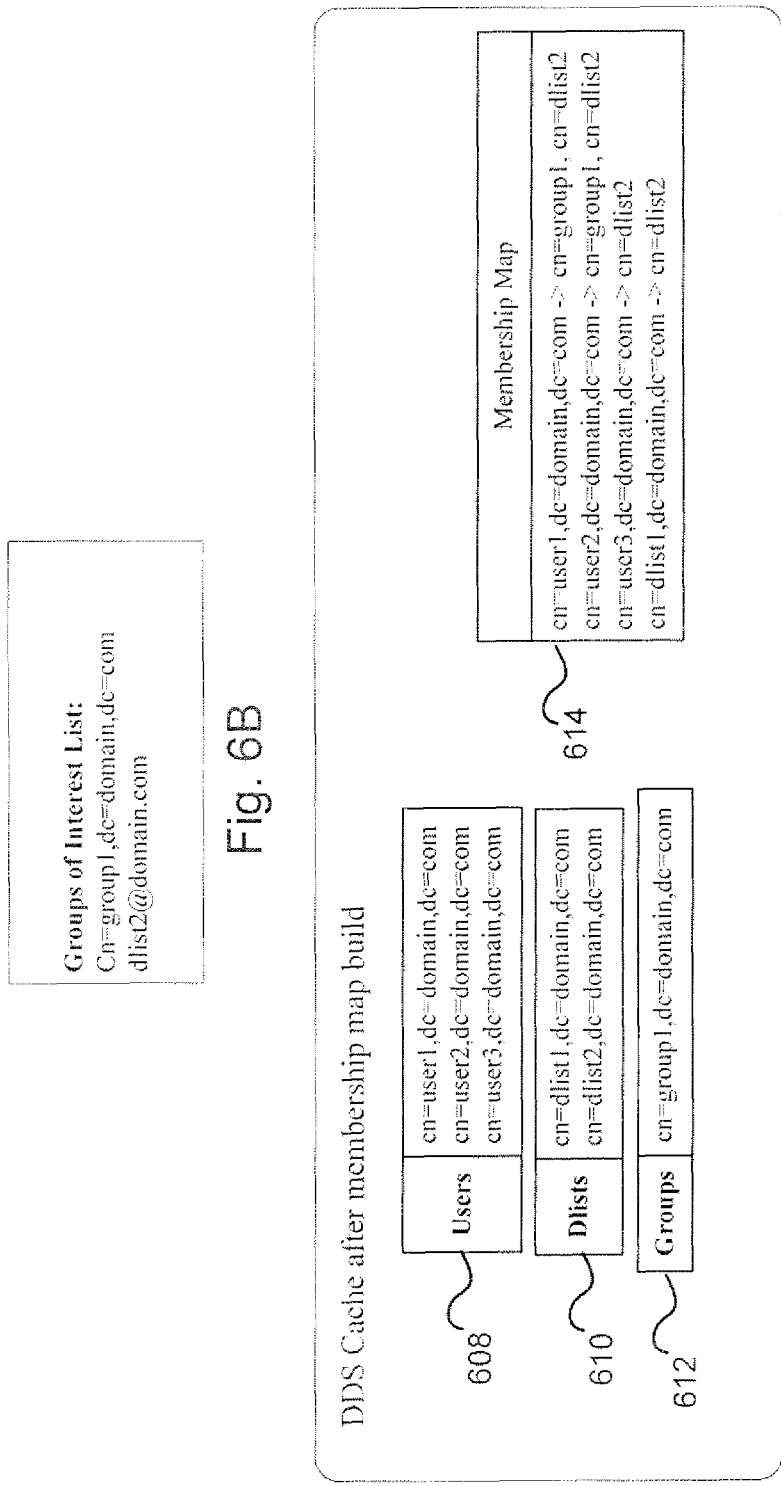

Referring to FIGS. 6A, 6B, and 6C there is depicted directory data structures in accordance with an embodiment of the present disclosure. According to an exemplary embodiment, a group of interest may be provided to a directory data service group resolution module. As illustrated in FIG. 6B, the exemplary groups of interest may include "group1" and "dlist2". Starting at the top level of the domain hierarchy illustrated in FIG. 6A and working down, element 602 is identified as containing "group1" and element 604 is identified as containing "dlist2". "Group1" is added to the group cache as depicted by element 612 of FIG. 6C. "Dlist2" is added to the distribution list cache as depicted by element 610 of FIG. 6C. These top level groups are further resolved to identify members, groups, and distribution lists. Resolving "group1" of element 602 identifies members "user1" and "user2". These users are added the user cache shown in element 608 of FIG. 6C. These users are part of the group of interest "group1" and thus they are mapped to "group1" in membership map 614. Resolving "dlist2" of element 604 identifies member "dlist1" and member "user3". "Dlist1" is added to the distribution list cache as depicted by element 610 of FIG. 6C. "User3" is added to the user cache shown in element 608 of FIG. 6C. "Dlist1" and member "user3" are part of group of interest "dlist2" and they are mapped to "dlist2" in membership map 614. "Dlist1" is further resolved to identify members "user1" and "user2", which are already present in the group cache. As is shown, several other groups and distribution lists are present which are not relevant to the groups of crest list in FIG. 6B and thus are not traversed, cached, or added to membership map 614 as part of the process for building the membership map cache.

Figure 7:
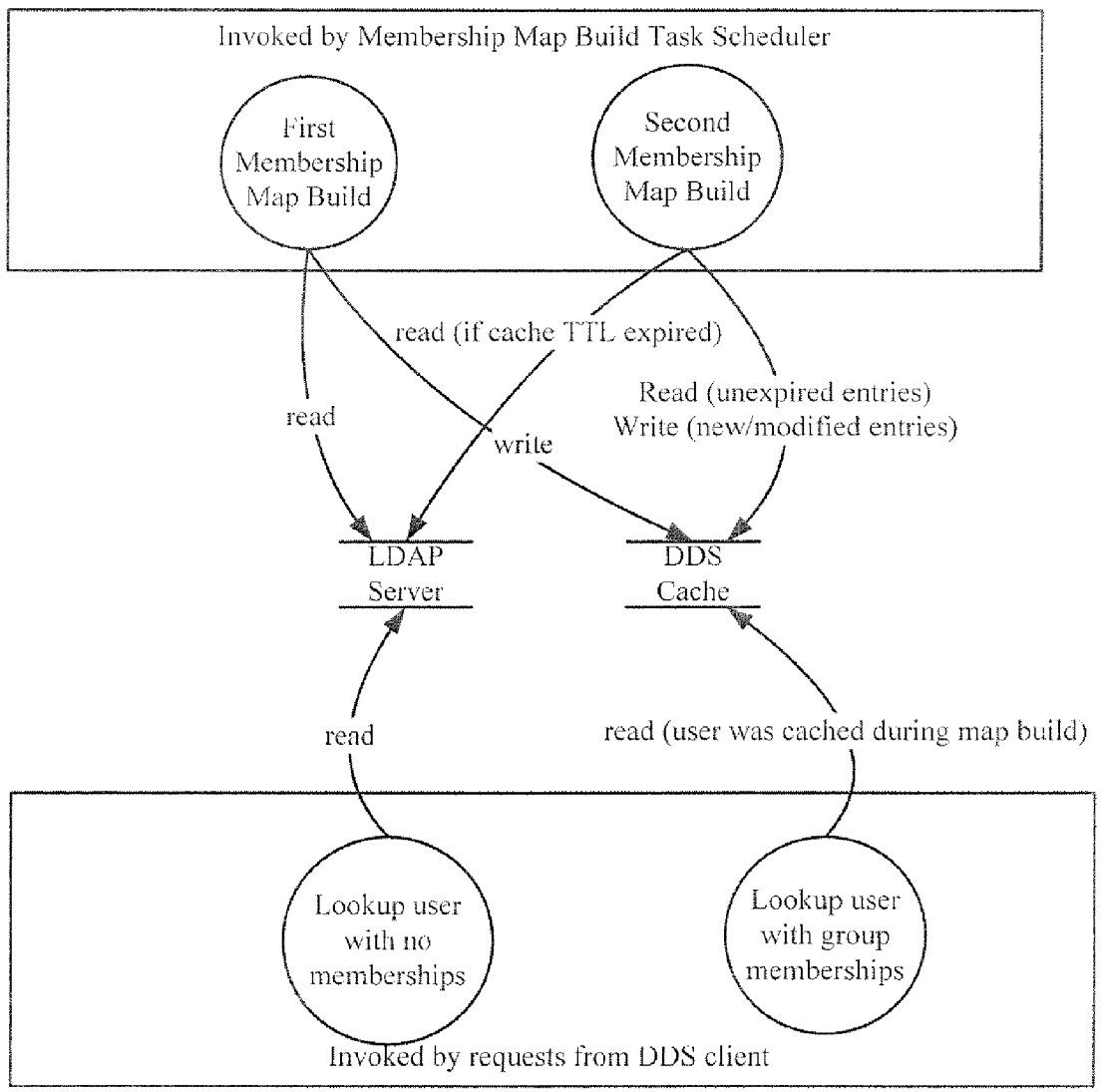
FIG. 7 depicts a flow diagram illustrating directory data services cache access in accordance with an embodiment of the present disclosure.

FIG. 7 depicts a flow diagram illustrating directory data services cache access in accordance with an embodiment of the present disclosure. As illustrated, according to some embodiments, both LDAP lookups and membership map building processes may only read from a LDAP server (i.e., no write access may be permitted.) A directory data service client performing a LDAP query may query a LDAP server to resolve a user who is not a member of any groups. A directory data service client performing a LDAP query may query a directory data service cache to resolve a user who is a member of one or more groups. An initial membership map build scheduled by a task scheduler may read from a LDAP server and write retrieved LDAP data to a directory data service cache. A subsequent membership map build may read from a LDAP server a cache entry is expired or not present and may write retrieved LDAP data to a directory data service cache. A subsequent membership map build may read from a directory data service cache if a directory entry is present an unexpired in cache.

FIG. 8 depicts a method of matching directory entries using query filter tokens in accordance with an embodiment of the present disclosure. According to some embodiments, when querying a directory server, query filter tokens may be used. Query filter tokens may allow a token to operate as a place older for a parameter in a query to be substituted at execution for the corresponding parameter token. For example, query filter tokens may include:

| Recipient address part | Token | Example |
|---|---|---|
| Full address | % s | some_user@exampledomain.com |
| User local part | % u | some_user |
| Domain part | % d | exampledomain.com |
| Full name | % n | some user (consecutive periods and underscore characters may be replaced with a space character) |

The % s token may be a placeholder in a query for a full email address. The % u token may be a placeholder in a query for a local portion of an email address. The % d token may be a placeholder in a query for a domain portion of an email address. The % n token may be a placeholder in a query for a full name, which may be derived by taking the local part of an email address and replacing period and underscore characters with a space character.

In addition to a 'mail' attribute value, an administrator of one or more types of mail servers may configure their server to accept email for a user based on their first name and/or last name, or a number of combinations of the thereof.
Given an example entry:
    dn: CN=John Bigboote, O=sfdom1
    givenname: John
    objectclass: dominoPerson
    uid: JBigboote_uid
    uid: JBigboote_uid2@eng.symantec.com
    mail: john.bigboote.mail@eng.symantec.com
    cn: John Bigboote
    sn: Bigboote
A mail server configured to receive mail for eng.symantec.com and aliasdomain.com may be configured to recognize one or more of the following as valid recipients:
    john@aliasdomain.com
    john@eng.symantec.com
    bigboote@aliasdomain.com
    bigboote@eng.symantec.com
    jbigboote_uid@aliasdomain.com
    jbigboote_uid@eng.symantec.com
    jbigboote_uid2@eng.symantec.com
    john.bigboote.mail@eng.symantec.com
    john.bigboote.mail@aliasdomain.com
    john.bigboote@aliasdomain.com
    john.bigboote@eng.symantec.com
    john_bigboote@aliasdomain.com
    john_bigboote@eng.symantec.com Because a mail server administrator may configure their server not to support these aliases (for instance, considering the 'mail' attribute values as the only deliverable addresses for a user), the administrator may also be able to configure their directory server query to be inclusive or exclusive of these different address forms. Large mail server deployments may use only the 'uid' and 'mail' attribute values as deliverable addresses. Such a configuration, continuing the example above, would support the following addresses:
    jbigboote_uid@aliasdomain.com
    jbigboote_uid@eng.symantec.com
    jbigboote_uid2@eng.symantec.com
    john.bigboote.mail@eng.symantec.com
    john.bigboote.mail@aliasdomain.com According to some embodiments, a query filter may be used to capture one or more of these (|(mail=% s)(uid=% s)(uid=% u))

If an administrator chooses to allow aliasing to a user's full name, the query can be changed to (|(mail=% s)(uid=% s)(uid=% u)(cn=% n))

Note here the use of the % n token, which may substitute a white space character for a period or underscore in the local part of an email address, such that john.bigboote@eng.symantec.com or john_bigboote@eng.symantec.com becomes (cn=john bigboote).

If the administrator also allows aliasing to a user's first and last name, the query may be changed to (|(mail=% s)(uid=% s)(uid=% u)(cn=% n)(givenName=% u)(sn=% u))

When aliasing on first and last name is allowed, it may be far more likely that a namespace 'collision' may occur between two or more user entries having the same first and/or last name. For instance, if our hypothetical directory server also contained an entry like

*dn*: CN = John Whorfin, O = sfdom1
    *givenname*: John
    ...
    *cn*: John Whorfin
    *sn*: Whorfin An SMTP server itself may handle an attempted delivery to john@aliasdomain.com by returning a 5xx error to the SMTP client with a text message that the recipient can't be uniquely identified. Since the directory data service LDAP query may return two entries for which (givenName=john), the condition may be handled as a data integrity error as described above.

As illustrated in FIG. 8, exemplary full addresses, local portions of email addresses, corresponding full names, and exemplary queries are illustrated in element 802. An exemplary directory entry is illustrated in element 806. Some directory servers (e.g., IBM Lotus Domino) may support a plurality of email aliases for a directory entry. As illustrated in element 804, multiple email aliases may be supported for the directory entry listed in element 806. As illustrated in elements 808 and 810, if a query is received to validate an email address of "john_smith@domain.com", a directory server query using tokens % s and % u may not find the directory entry. However, as depicted in elements 812 and 814, if a on token is used to query on a fullname, a match may be found. A an token may replace periods or underscores in a local part of an email address with a space to derive a fullname for querying.

At this point should be noted that directory server integration in accordance with the present disclosure as described above typically involves the processing of input data and the generation of output data to some extent. This input data processing and output data generation may be implemented in hardware or software. For example, specific electronic components may be employed in a directory data service or similar or related circuitry for implementing the functions associated with directory server integration in accordance with the present disclosure as described above. Alternatively, one or more processors operating in accordance with instructions may implement the functions associated with directory server integration in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for directory data resolution comprising:
   receiving data identifying one or more groups of interest of a directory server;
   traversing, using at least one computer processor, one or more directory entries contained in hierarchical directory data, the traversal starting at a directory entry corresponding to a current group of interest;
   reading a first directory entry to identify a member contained in the first directory entry;
   adding, in the event a member is contained in the first directory entry, the current group of interest to a mapping for the member;
   determining whether the first directory entry contains a further directory entry;
   reading, in the event a further directory entry is contained in the first directory entry, the further directory entry to determine whether the current group of interest is to be added to a mapping for another member and whether additional hierarchical directory data levels are to be traversed for the current group of interest; and
   expiring a directory entry of the one or more directory entries in cache based on an expiration time determined by a separate random value assigned to each of the one or more directory entries, the random value used to distribute expiration times for the cached one or more directory entries to reduce a load required to refresh expired directory entries in cache at a point in time, wherein the expiration time determined by the separate random value is within a specified range of permissible expiration times.

2. The method of claim 1, wherein the one or more directory entries comprise at least one of: a user, a group, and a distribution list.

3. The method of claim 1, further comprising repeating a traversal of one or more directory entries contained in hierarchical directory data for a second group of interest.

4. The method of claim 1, further comprising caching a list of identified users associated with a group membership map.

5. The method of claim 1, further comprising caching a list of identified distribution lists associated with a group membership map.

6. The method of claim 1, further comprising caching a list of identified groups associated with a group membership map.

7. The method of claim 1, wherein policies are applied to groups of interest and a mapping of one or more members to a group of interest improves performance associated with applying a policy.

8. The method of claim 1, wherein in the event a directory entry is available in cache, analysis is performed using the cache, and wherein in the event a directory entry is unavailable in cache, a query is made to the directory server.

9. The method of claim 8, wherein a directory entry is unavailable in cache if the directory entry is expired.

10. The method of claim 9, further comprising:
    determining that the directory server is unavailable; and
    using the expired corresponding directory entry for directory data resolution.

11. The method of claim 8, wherein cached directory entries allow concurrent use by a process traversing hierarchical directory data to generate a mapping of one or more users to a group and by a directory data service client.

12. The method of claim 1, wherein the data identifying one or more groups of interest of a directory server is received from an application and wherein at least one mapping of a member to a group of interest is provided to the application for application of a policy.

13. The method of claim 1, further comprising:
    identifying a circular group relationship in the one or more directory entries contained in hierarchical directory data during traversal; and
    providing an alert containing data integrity error information associated with the circular group relationship to the administrator.

14. The method of claim 1, wherein the directory server is a LDAP compliant directory server.

15. At least one non-transitory processor readable storage medium for storing a computer program of instructions configured to be readable by at least one processor for instructing the at least one processor to execute a computer process for performing the method as recited in claim 1.

16. An article of manufacture for directory data resolution, the article of manufacture comprising:
    at least one non-transitory processor readable storage medium; and
    instructions stored on the at least one medium;
    wherein the instructions are configured to be readable from the at least one medium by at least one processor and thereby cause the at least one processor to operate so as to:
      receive data identifying one or more groups of interest of a directory server;
      traverse one or more directory entries contained in hierarchical directory data, the traversal starting at a directory entry corresponding to a current group of interest;
      read a first directory entry to identify a member contained in the first directory entry;
      add, in the event a member is contained in the first directory entry, the current group of interest to a mapping for the member;
      determine whether the first directory entry contains a further directory entry;
      read, in the event a further directory entry is contained in the first directory entry, the further directory entry to determine whether the current group of interest is to be added to a mapping for another member and whether additional hierarchical directory data levels are to be traversed for the current group of interest; and
      expire a directory entry of the one or more directory entries in cache based on an expiration time determined by a separate random value assigned to each of the one or more directory entries, the random value used to distribute expiration times for the cached one or more directory entries to reduce a load required to refresh expired directory entries in cache at a point in time, wherein the expiration time determined by the separate random value is within a specified range of permissible expiration times.

17. A system for directory data resolution comprising:
    one or more processors communicatively coupled to a network; wherein the one or more processors are configured to:

receive data identifying one or more groups of interest of a directory server;

traverse one or more directory entries contained in hierarchical directory data, the traversal starting at a directory entry corresponding to a current group of interest;

read a first directory entry to identify a member contained in the first directory entry;

add, in the event a member is contained in the first directory entry, the current group of interest to a mapping for the member;

determine whether the first directory entry contains a further directory entry;

read, in the event a further directory entry is contained in the first directory entry, the further directory entry to determine whether the current group of interest is to be added to a mapping for another member and whether additional hierarchical directory data levels are to be traversed for the current group of interest; and expire a directory entry of the one or more directory entries in cache based on an expiration time determined by a separate random value assigned to each of the one or more directory entries, the random value used to distribute expiration times for the cached one or more directory entries to reduce a load required to refresh expired directory entries in cache at a point in time, wherein the expiration time determined by the separate random value is within a specified range of permissible expiration times.

18. The system of claim 17, wherein the one or more directory entries comprise at least one of: a member, a group, and a distribution list.

19. The system of claim 17, wherein the one or more processors are further configured to:

repeat a traversal of one or more directory entries contained in hierarchical directory data for a second group of interest.

20. The system of claim 17, wherein in the event a directory entry is available in cache, analysis is performed using the cache, and wherein in the event a directory entry is unavailable in cache, a query is made to the directory server.

21. The system of claim 20, wherein a directory entry available in cache is identified by a cache index using query filter token allowing directory entry matching using a full name derived from a local part of an email address.

22. The system of claim 17, wherein the data identifying one or more groups of interest of a directory server is received from an application and wherein at least one mapping of a member to a group of interest is provided to the application to apply a policy.

* * * * *